US008561749B2

(12) United States Patent
Person et al.

(10) Patent No.: US 8,561,749 B2
(45) Date of Patent: Oct. 22, 2013

(54) ATV OR UTV DIFFERENTIAL WITH INTEGRATED SENSORS

(71) Applicant: HB Performance Systems, Inc., Mequon, WI (US)

(72) Inventors: Kurt W. Person, Cedarburg, WI (US); Peter E. True, West Bend, WI (US); Michael E. Kenny, Cedarburg, WI (US)

(73) Assignee: HB Performance Systems, Inc., Mequon, WI (US)

( * ) Notice: Subject to any disclaimer, the term of this patent is extended or adjusted under 35 U.S.C. 154(b) by 0 days.

(21) Appl. No.: 13/622,706

(22) Filed: Sep. 19, 2012

(65) Prior Publication Data

US 2013/0069337 A1  Mar. 21, 2013

Related U.S. Application Data

(60) Provisional application No. 61/536,394, filed on Sep. 19, 2011.

(51) Int. Cl.
*B60K 17/16* (2006.01)
*G01P 3/44* (2006.01)
*F16H 59/38* (2006.01)

(52) U.S. Cl.
USPC ............ 180/337; 73/494; 74/606 R; 477/35

(58) Field of Classification Search
CPC ........ B60K 17/16; B60K 17/165; G01P 3/44; G01P 3/443; G01P 3/48; G01P 3/487; G01P 3/488; B60T 8/329; F16H 59/38; F16H 59/46; F16H 2048/204
USPC .......... 180/337; 280/124.156; 74/424, 606 R, 74/607; 477/35; 324/160, 173, 174, 324/207.22, 207.25; 73/494
See application file for complete search history.

(56) References Cited

U.S. PATENT DOCUMENTS

| 3,138,970 | A | * | 6/1964 | Costa et al. ................... 475/86 |
| 3,563,350 | A |   | 2/1971 | Leiber |
| 3,944,289 | A |   | 3/1976 | Jones |
| 4,263,824 | A | * | 4/1981 | Mueller ........................ 475/86 |
| 4,953,670 | A | * | 9/1990 | Chemelewski ........... 188/181 A |
| 5,117,934 | A |   | 6/1992 | Tsuyama et al. |

(Continued)

FOREIGN PATENT DOCUMENTS

| EP | 424324 A1 * | 4/1991 |
| EP | 0655362     | 5/1995 |

(Continued)

*Primary Examiner* — Joseph Rocca
(74) *Attorney, Agent, or Firm* — Michael Best & Friedrich LLP

(57) ABSTRACT

A vehicle comprising a frame, a seat coupled to the frame, and left and right wheels. Left and right drive shafts transmit power to the left and right wheels, and an input shaft transmits power to the left and right drive shafts. A differential including a housing assembly receives power from the input shaft and divides the power between the left and right drive shafts. A speed sensor is positioned through (e.g., threaded) the housing assembly such that an inner end of the sensor is positioned inside the differential. In one embodiment, the speed sensor includes left and right speed sensors, and the at least two housings comprise a left housing and a right housing. Preferably, both the left speed sensor and the right speed sensor are positioned in one of the left housing and the right housing.

15 Claims, 2 Drawing Sheets

(56) References Cited

U.S. PATENT DOCUMENTS

| | | | |
|---|---|---|---|
| 5,253,931 A | 10/1993 | Koster et al. | |
| 5,451,868 A * | 9/1995 | Lock | 324/173 |
| 6,133,729 A * | 10/2000 | Mierzwinski | 324/174 |
| 6,203,464 B1 * | 3/2001 | Ishikawa et al. | 475/150 |
| 6,412,368 B1 * | 7/2002 | Seki et al. | 74/650 |
| 6,650,989 B2 | 11/2003 | Gronau et al. | |
| 6,796,404 B1 * | 9/2004 | Dick et al. | 188/1.11 E |
| 7,107,138 B2 | 9/2006 | Currie | |
| 7,159,954 B2 | 1/2007 | Goebels et al. | |
| 7,191,048 B2 | 3/2007 | Aizawa et al. | |
| 7,248,956 B2 | 7/2007 | Erban et al. | |
| 7,302,328 B2 | 11/2007 | Kato et al. | |
| 7,349,776 B2 | 3/2008 | Spillane et al. | |
| 7,600,599 B1 * | 10/2009 | Dahl et al. | 180/249 |
| 2002/0167218 A1 | 11/2002 | Chubb | |
| 2005/0085986 A1 | 4/2005 | Aizawa et al. | |
| 2007/0235242 A1 * | 10/2007 | Nozaki et al. | 180/247 |
| 2009/0240399 A1 | 9/2009 | Dagenais et al. | |
| 2010/0272380 A1 * | 10/2010 | Zink et al. | 384/448 |
| 2011/0035111 A1 | 2/2011 | Daenais et al. | |

FOREIGN PATENT DOCUMENTS

| | | |
|---|---|---|
| EP | 442121 B1 * | 6/1995 |
| EP | 0983928 | 3/2000 |
| GB | 2043256 A * | 10/1980 |
| GB | 2472442 A * | 2/2011 |
| WO | WO8103471 A1 * | 10/1981 |
| WO | 2009073636 | 6/2009 |

* cited by examiner

ATV OR UTV DIFFERENTIAL WITH INTEGRATED SENSORS

BACKGROUND

The present invention relates generally to All-Terrain Vehicle (ATVs) and Utility-Terrain Vehicles (UTVs), and more specifically to differentials for such vehicles.

Modern ATVs/UTVs are often equipped with differentials for transmitting toque to the wheels. These differentials include an input shaft, two output shafts, a housing, and intermeshing gears for transmitting torque from the input shaft to the output shafts.

Some ATVs/UTVs also include electronically-controlled systems that require information regarding the operation of the ATV/UTV. For example, ATVs/UTVs can include electronically-controlled throttles, fuel injection and brakes (e.g., for traction control, anti-lock braking, and the like). These systems often demand information regarding the vehicle's speed, acceleration, throttle position, etc. This information is commonly provided by sensors placed at various locations on the vehicle.

SUMMARY OF THE INVENTION

ATVs/UTVs are typically operated in off-road environments where they may come into contact with objects such as trees, rocks, etc. In light of the rough environment encountered by ATVs/UTVs, the positioning of vehicle sensors in a protected location can reduce the likelihood of the sensor being damaged.

Accordingly, the present invention provides an all-terrain vehicle comprising a frame, a seat coupled to the frame, and left and right wheels (e.g., rear wheels). Left and right drive shafts (e.g., half shafts) transmit power to the left and right wheels, respectively, and an input shaft transmits power to the left and right drive shafts. A differential including a housing assembly receives power from the input shaft and divides the power between the left and right drive shafts. A speed sensor is positioned through (e.g., threaded) the housing assembly such that an inner end of the sensor is positioned inside the differential.

In one embodiment, the housing assembly includes at least two housings, and the speed sensor includes a left speed sensor for sensing a speed of the left wheel and a right speed sensor for sensing a speed of the right wheel. Preferably, the at least two housings comprise a left housing and a right housing, and both the left speed sensor and the right speed sensor are positioned in one of the left housing and the right housing.

In another embodiment, the differential can further include an input gear mounted for rotation with the input shaft, wherein one of the speed sensors detects a speed of the input gear. The differential can also include a tone ring mounted for rotation with one of the left and right drive shafts, wherein the other of the speed sensors detects a speed of the tone ring.

An outer end of each speed sensor can be positioned outside the housing assembly, and the vehicle can further include a wire coupled to the outer end of each speed sensor.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
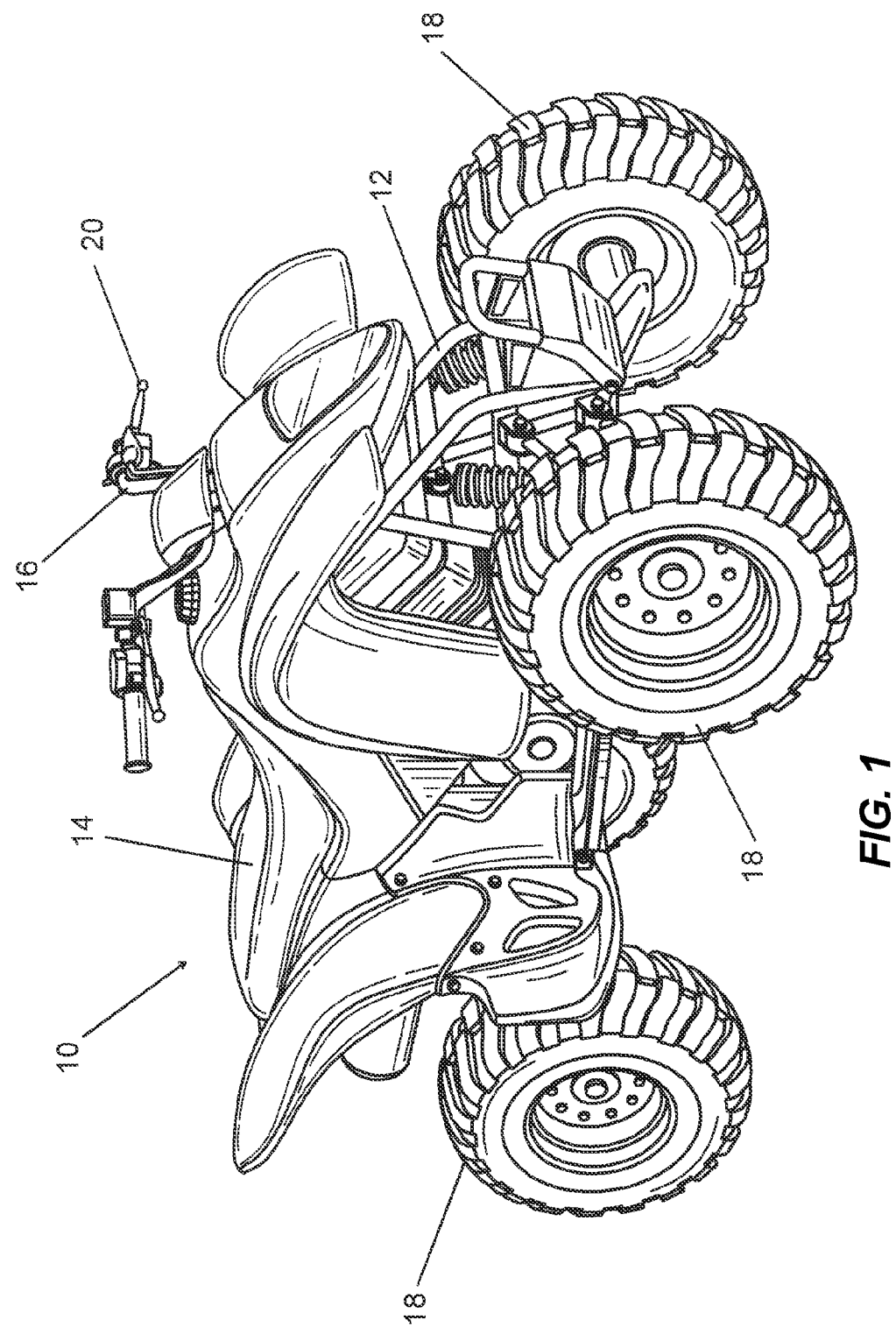
FIG. 1 is a perspective view of an ATV embodying the present invention.

FIG. 1 illustrates an ATV 10 embodying the present invention. The ATV 10 includes a frame 12, a seat 14, handlebars 16, and four wheels 18, as is known in the art. Braking is actuated by brake levers 20 mounted on the handlebars 16. ATVs typically have manual or automatic transmissions coupling an engine to a drive train.

Figure 2:
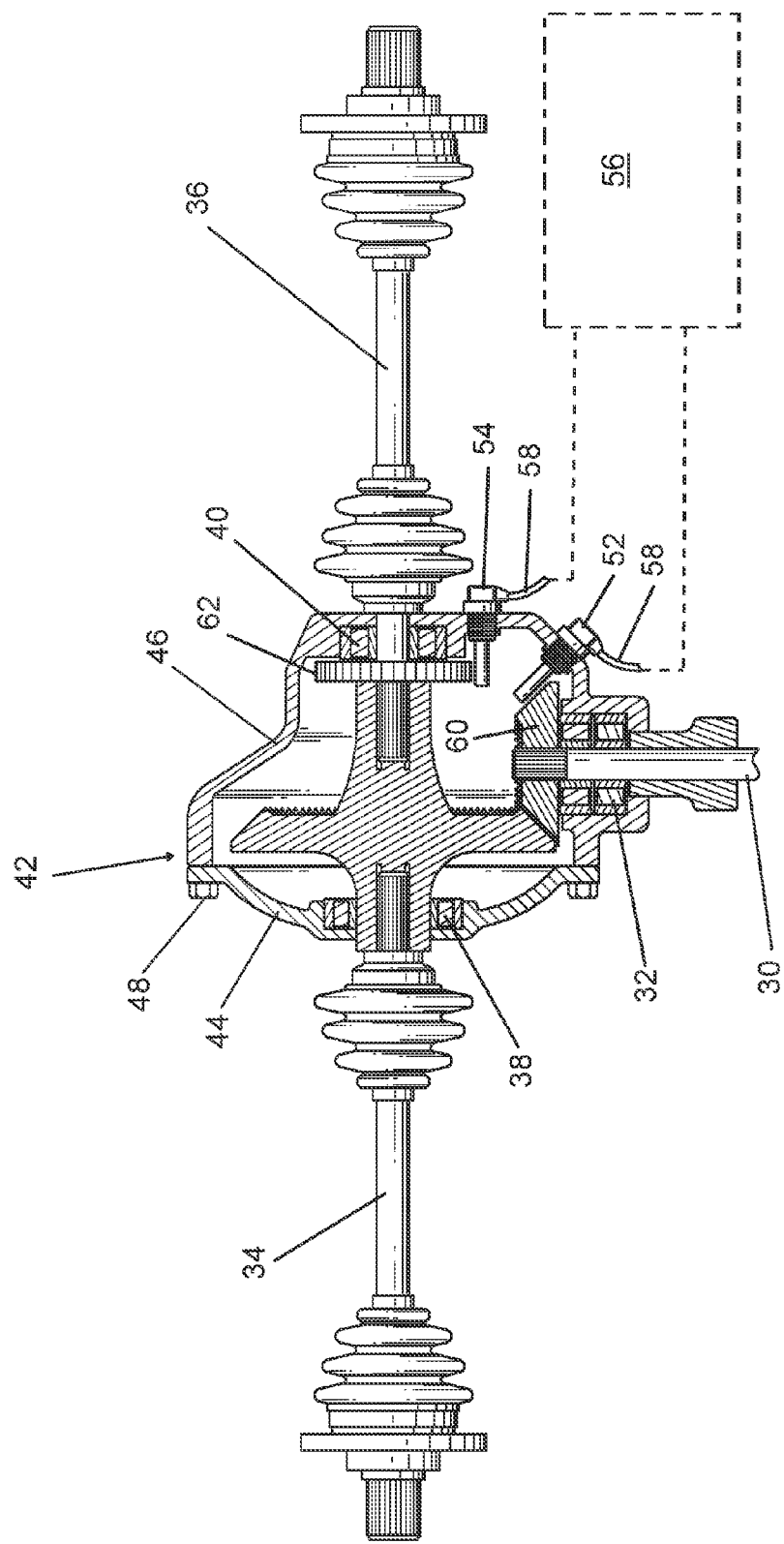
FIG. 2 is a partially-sectioned view of the drive train of the ATV of FIG. 1.

ATVs typically have four-wheel-drive drive trains, including front and rear differentials. FIG. 2 illustrates a portion of a representative drive train including an input shaft 30, input bearing 32, left and right drive shafts 34,36 (e.g., half shafts), left and right bearings 38,40, and a differential 42 that transmits torque from the input shaft 30 to the left and right half shafts 34,36. The left and right half shafts 34,36 drive left and right wheels 18 (e.g., front wheels or rear wheels), respectively. The differential 42 includes a housing assembly including left and right housings 44,46 secured together with fasteners 48. Multiple internal gears are provided inside the housing assembly for transferring torque from the input shaft 30 to the half shafts 34,36. The present invention is applicable to differentials having a wide variety of configurations, so the details of the internal operation of the differential 42 will not be described in detail.

The illustrated differential further includes left and right speed sensors 52,54 for measuring the speeds of the left and right half shafts 34,36, respectively. The information regarding half shaft speed can be used by a vehicle control unit 56 to control certain operations of the vehicle (e.g., traction control, anti-lock braking, vehicle stability control, proportional torque control, etc.). The illustrated speed sensors 52,54 are mounted in and extend through the differential housing so that a majority of each sensor is positioned in and protected by the differential housing. In the illustrated embodiment, both speed sensors 52,54 are threaded into the right housing 46, which facilitates installation of and access to the speed sensors 52,54. A rear portion of each sensor is exposed to the exterior of the differential housing so that an electrical connection 58 (e.g., a wire) can be made to each sensor for communication with other systems of the vehicle.

There are a variety of ways to obtain the desired information regarding the speed of the half shafts. In the illustrated embodiment, the left speed sensor is positioned near and detects the presence of teeth of an input gear 60 on the input shaft, and the right speed sensor is positioned near and detects the presence of teeth of a tone ring 62 coupled to the right half shaft 36. Using these sensors, the rotational speed of both the left and right half shafts 34,36 can be determined by the equation $a=pb+qc$, where a, b, and c are the angular velocities of the three shafts and p and q are constants for a particular differential. It should be understood that there are others ways of gathering the desired information, such as by provide each half shaft with a tone ring or by sensing the speed of existing structure (e.g., shafts and/or gears) without the addition of tone rings. In addition, the sensors can be provided using a variety of formats, such as passive (e.g., magnetic) or active (e.g., hall effect).

Various features and advantages of the invention are set forth in the following claims.

The invention claimed is:

1. A vehicle comprising:
a frame;
a seat coupled to the frame;
left and right wheels;
left and right drive shafts for transmitting power to the left and right wheels, respectively;
an input shaft for transmitting power to the left and right drive shafts;
a differential for receiving power from the input shaft and dividing the power between the left and right drive shafts, wherein the differential includes a housing assembly; and
a speed sensor positioned through the housing assembly such that an inner end of the sensor is positioned inside the differential;
wherein the housing assembly comprises at least two housing portions,
wherein the speed sensor includes a left speed sensor for sensing a speed of the left wheel and a right speed sensor for sensing a speed of the right wheel, and
wherein the at least two housing portions comprise a left housing and a right housing, and wherein both the left speed sensor and the right speed sensor are positioned in one of the left housing and the right housing.

2. A vehicle as claimed in claim 1, wherein the left and right wheels comprise rear wheels.

3. A vehicle as claimed in claim 1, wherein the left and right drive shafts comprise half shafts.

4. A vehicle as claimed in claim 1, wherein the differential further includes an input gear mounted for rotation with the input shaft, and wherein one of the speed sensors detects a speed of the input gear.

5. A vehicle as claimed in claim 4, wherein the differential further includes a tone ring mounted for rotation with one of the left and right drive shafts, and wherein the other of the speed sensors detects a speed of the tone ring.

6. A vehicle as claimed in claim 1, wherein an outer end of at least one of the left speed sensor and the right speed sensor is positioned outside the housing assembly.

7. A vehicle as claimed in claim 6, further comprising a wire coupled to the outer end of each speed sensor.

8. A vehicle as claimed in claim 1, wherein at least one of the left speed sensor and the right speed sensor is threaded into the housing assembly.

9. A vehicle comprising:
a frame;
a seat coupled to the frame;
left and right wheels;
left and right drive shafts for transmitting power to the left and right wheels, respectively;
an input shaft for transmitting power to the left and right drive shafts;
a differential for receiving power from the input shaft and dividing the power between the left and right drive shafts, wherein the differential includes a housing assembly; and
a speed sensor positioned through the housing assembly such that an inner end of the sensor is positioned inside the differential;
wherein the housing assembly comprises at least two housing portions,
wherein the speed sensor includes a left speed sensor for sensing a speed of the left wheel and a right speed sensor for sensing a speed of the right wheel, and
wherein the differential further includes an input gear mounted for rotation with the input shaft, and wherein one of the speed sensors detects a speed of the input gear.

10. A vehicle as claimed in claim 9, wherein the differential further includes a tone ring mounted for rotation with one of the left and right drive shafts, and wherein the other of the speed sensors detects a speed of the tone ring.

11. A vehicle as claimed in claim 9, wherein an outer end of at least one of the left speed sensor and the right speed sensor is positioned outside the housing assembly.

12. A vehicle as claimed in claim 11, further comprising a wire coupled to the outer end of each speed sensor.

13. A vehicle as claimed in claim 9, wherein at least one of the left speed sensor and the right speed sensor is threaded into the housing assembly.

14. A vehicle as claimed in claim 9, wherein the left and right wheels comprise rear wheels.

15. A vehicle as claimed in claim 9, wherein the left and right drive shafts comprise half shafts.

* * * * *